United States Patent
Kwon et al.

(10) Patent No.: US 9,263,911 B2
(45) Date of Patent: Feb. 16, 2016

(54) WIRELESS CHARGING APPARATUS FOR CABLE-TYPE SECONDARY BATTERY

(71) Applicant: LG Chem, Ltd., Seoul (KR)

(72) Inventors: Yo-Han Kwon, Daejeon (KR); Sang-Wook Woo, Daejeon (KR); Hye-Ran Jung, Daejeon (KR); Je-Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 2 days.

(21) Appl. No.: 14/293,045

(22) Filed: Jun. 2, 2014

(65) Prior Publication Data

US 2014/0320076 A1 Oct. 30, 2014

Related U.S. Application Data

(63) Continuation of application No. PCT/KR2014/002510, filed on Mar. 25, 2014.

(30) Foreign Application Priority Data

Apr. 26, 2013 (KR) .................. 10-2013-0046759

(51) Int. Cl.
*H02J 7/00* (2006.01)
*H02J 7/02* (2006.01)

(52) U.S. Cl.
CPC ...................... *H02J 7/025* (2013.01)

(58) Field of Classification Search
USPC ........................................... 320/108
See application file for complete search history.

(56) References Cited

U.S. PATENT DOCUMENTS

| | | | |
|---|---|---|---|
| 6,208,115 B1* | 3/2001 | Binder | 320/108 |
| 7,511,454 B1* | 3/2009 | Legg | 320/108 |
| 7,777,448 B2* | 8/2010 | Beghelli | 320/113 |
| 2010/0203372 A1 | 8/2010 | Kim et al. | |
| 2011/0241617 A1* | 10/2011 | Hoffman et al. | 320/108 |
| 2012/0009331 A1* | 1/2012 | Kwon et al. | 427/58 |
| 2012/0121957 A1 | 5/2012 | Kwon et al. | |
| 2012/0121969 A1* | 5/2012 | Takemura et al. | 429/176 |

FOREIGN PATENT DOCUMENTS

| | | |
|---|---|---|
| JP | 2005-124324 A | 5/2005 |
| JP | 2007294274 A | 11/2007 |
| JP | 2010-534389 A | 11/2010 |

(Continued)

*Primary Examiner* — Robert Grant
(74) *Attorney, Agent, or Firm* — Lerner, David, Littenberg, Krumholz & Mentlik, LLP

(57) ABSTRACT

Disclosed is a wireless charging apparatus for a cable-type secondary battery. The wireless charging apparatus for the cable-type secondary battery according to the present disclosure includes a socket having a space formed inside for mounting the cable-type secondary battery, a first terminal that is electrically connected to an outer current collector of the cable-type secondary battery mounted in the socket, a second terminal that is electrically connected to an inner current collector of the cable-type secondary battery mounted in the socket, and a secondary coil for wireless charging having one end connected with the first terminal and the other end connected with the second terminal, and wound along an outer circumferential surface of the socket. According to the present disclosure, even if a secondary coil for wireless power reception is absent from a cable-type secondary battery, charging may be performed by a method for wireless power transmission and reception.

4 Claims, 6 Drawing Sheets

(56) References Cited

FOREIGN PATENT DOCUMENTS

| | | | |
|---|---|---|---|
| JP | 2011-030284 A | 2/2011 | |
| KR | 10-2005-0099903 A | 10/2005 | |
| KR | 2012-0008634 A | 2/2012 | |
| KR | 2012-0051135 A | 5/2012 | |

* cited by examiner

WIRELESS CHARGING APPARATUS FOR CABLE-TYPE SECONDARY BATTERY

CROSS-REFERENCE TO RELATED APPLICATION

The present application is a continuation of International Application No. PCT/KR2014/002510 filed on Mar. 25, 2014, which claims priority to Korean Patent Application No. 10-2013-0046759 filed in the Republic of Korea on Apr. 26, 2013, the disclosure of which is incorporated herein by reference.

TECHNICAL FIELD

The present disclosure relates to a wireless charging apparatus for a cable-type secondary battery, and more particularly, to an apparatus that may supply a charging power to a cable-type secondary battery through a secondary coil.

BACKGROUND ART

With the technology development and the growing demands for a mobile device, an electric vehicle, a hybrid electric vehicle, an energy storage system, an uninterruptible power supply, and the like, the demand for a secondary battery as an energy source is dramatically increasing, and in this context, many studies are being conducted on batteries to meet various needs.

A secondary battery is a device that stores electrical energy in chemical form and converts the stored chemical energy into electrical energy to generate electricity when needed. The secondary battery is also referred to as a 'rechargeable battery' because it can be recharged repeatedly. A common secondary battery includes a lead accumulator, a NiCd battery, a NiMH accumulator, a Li-ion battery, a Li-ion polymer battery, and the like. When compared to a disposable primary battery, not only is the secondary battery more economically efficient, it is also more environmentally friendly.

Generally, most secondary batteries have a cylindrical, prismatic, or pouch shape. These secondary batteries are classified into pouch-type, cylindrical, and prismatic secondary batteries based on a type of an outer case. The secondary batteries have advantages of easy fabrication and low manufacturing costs because the secondary batteries are fabricated by mounting an electrode assembly composed of an anode, a cathode, and a separator in a cylindrical or prismatic metal can or a pouch-shaped case of an aluminum laminate sheet, and by injecting an electrolyte into the electrode assembly. When a predetermined mounting space for the secondary battery is required, there is a drawback in that adaptation in shape is limited. Thus, the cylindrical, prismatic or pouch shape of the secondary battery is a limitation in developing various shapes of mobile devices. Accordingly, there is a need for a new type of secondary battery that is easily adaptable in shape.

To fulfill this need, suggestions have been made to develop a cable-type secondary battery having a very high ratio of length to cross-sectional diameter. Korean Patent Application publication No. 2005-99903 discloses an adaptable battery consisting of an inner electrode, an outer electrode and an electrolyte layer interposed therebetween. Such secondary battery is mainly characterized by having a so-called cable structure which is constructed in an elongated shape and is flexible in a lengthwise direction.

Meanwhile, intensive studies have been conducted on an apparatus for charging a cable-type secondary battery that supplies power to the cable-type secondary battery.

DISCLOSURE

Technical Problem

The present disclosure is designed to solve the problem of the related art, and therefore, an object of the present disclosure is to provide an apparatus that may receive power wirelessly and charge a cable-type secondary battery.

Technical Solution

To achieve the above object, a wireless charging apparatus for a cable-type secondary battery according to the present disclosure includes a socket having a space formed inside for mounting the cable-type secondary battery, a first terminal that is electrically connected to an outer current collector of the cable-type secondary battery mounted in the socket, a second terminal that is electrically connected to an inner current collector of the cable-type secondary battery mounted in the socket, and a secondary coil for wireless charging having one end connected with the first terminal and the other end connected with the second terminal, and wound along an outer circumferential surface of the socket.

According to an exemplary embodiment of the present disclosure, the socket is cylindrical. In this case, the cylindrical socket may be open to at least one of a top and a bottom of a cylinder.

According to another exemplary embodiment of the present disclosure, the socket includes a first cover having a hemispherical cross sectional area and a second cover having a hemispherical cross sectional area, and the secondary coil for wireless charging is in a form of surrounding the outer circumferential surface of the socket when the first cover and the second cover are engaged with each other to form a cylindrical shape. In this case, the first cover and the second cover may be connected such that the first cover and the second cover come in contact with each other at any one corner to allow opening and closing. Also, for this, the first cover and the second cover may be connected through a hinge.

According to still another exemplary embodiment of the present disclosure, the first terminal has a shape that the first terminal is coupled with a first plug electrically connected to the outer current collector of the cable-type secondary battery and formed at one end of the cable-type secondary battery, and the second terminal has a shape that the second terminal is coupled with a second plug electrically connected to the inner current collector of the cable-type secondary battery and formed at the other end of the cable-type secondary battery.

The wireless charging apparatus for the cable-type secondary battery according to the present disclosure may be a component of a wireless charging set for a cable-type secondary battery including a wireless charging power supply apparatus for a cable-type secondary battery including a primary coil for wireless charging.

To achieve the above object, a wireless charging apparatus for a cable-type secondary battery according to the present disclosure includes a plate having a slit formed for mounting the cable-type secondary battery, a first terminal that is electrically connected to an outer current collector of the cable-type secondary battery mounted in the slit of the plate, a second terminal that is electrically connected to an inner current collector of the cable-type secondary battery mounted in the slit of the plate, and a secondary coil for wireless charging having one end connected with the first terminal and the other end connected with the second terminal.

According to an exemplary embodiment of the present disclosure, the plate has at least two slits. In this case, the first terminal and the second terminal electrically connected to cable-type secondary batteries mounted in the at least two slits may have an electrically parallel relationship with the secondary coil for wireless charging.

According to an exemplary embodiment of the present disclosure, the first terminal has a shape that the first terminal is coupled with a first plug electrically connected to the outer current collector of the cable-type secondary battery and formed at one end of the cable-type secondary battery, and the second terminal has a shape that the second terminal is coupled with a second plug electrically connected to the inner current collector of the cable-type secondary battery and formed at the other end of the cable-type secondary battery.

The wireless charging apparatus for the cable-type secondary battery according to the present disclosure may be a component of a wireless charging set for a cable-type secondary battery including a wireless charging power supply apparatus for a cable-type secondary battery including a primary coil for wireless charging.

Advantageous Effects

According to an aspect of the present disclosure, even if a secondary coil for wireless power reception is absent from a cable-type secondary battery, charging may be performed by a method for wireless power transmission and reception.

According to another aspect of the present disclosure, power is transferred to a cable-type secondary battery through a secondary coil regardless of a shape of the cable-type secondary battery and a shape of a wireless power transmitter using a primary coil, thereby improving compatibility of a charging apparatus.

DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

MODE FOR CARRYING OUT THE INVENTION

Hereinafter, the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
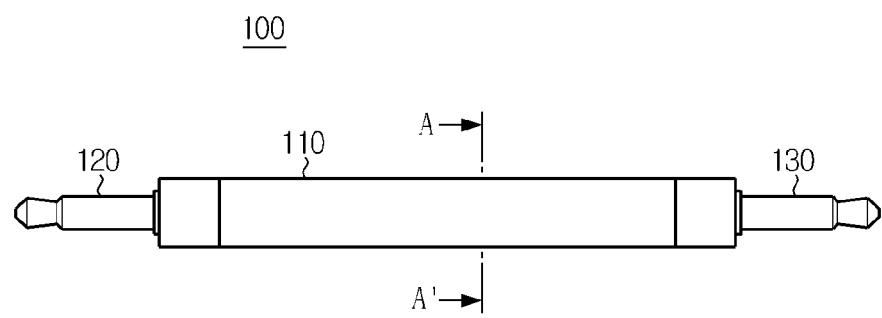
FIG. 1 is a view schematically illustrating an example of a construction of a cable-type secondary battery.

FIG. 1 is a view schematically illustrating an example of a construction of a cable-type secondary battery 100.

Referring to FIG. 1, the cable-type secondary battery 100 according to an example includes a secondary battery body 110, a first plug 120, and a second plug 130. The cable-type secondary battery 100 shown in FIG. 1 is an example of a cable-type secondary battery for convenience of understanding in the description of a wireless charging apparatus for a cable-type secondary battery (hereinafter referred to as a 'charging apparatus'). Particularly, the cable-type secondary battery 100 is a cable-type secondary battery including the first and second plugs 120 and 130 specially in opposite directions to help understanding of an electrical connection with a charging apparatus according to the present disclosure. Accordingly, the scope of the present disclosure is not limited by the cable-type secondary battery 100 shown in FIG. 1.

The secondary battery body 110 has a cable structure that is constructed in an elongated shape and is flexible in a lengthwise direction. The secondary battery body 110 includes a configuration which receives electrical energy supplied from an external source, stores the electrical energy in chemical form, and converts the stored chemical energy into electrical energy to provide electricity to an external other device when needed.

Figure 2:
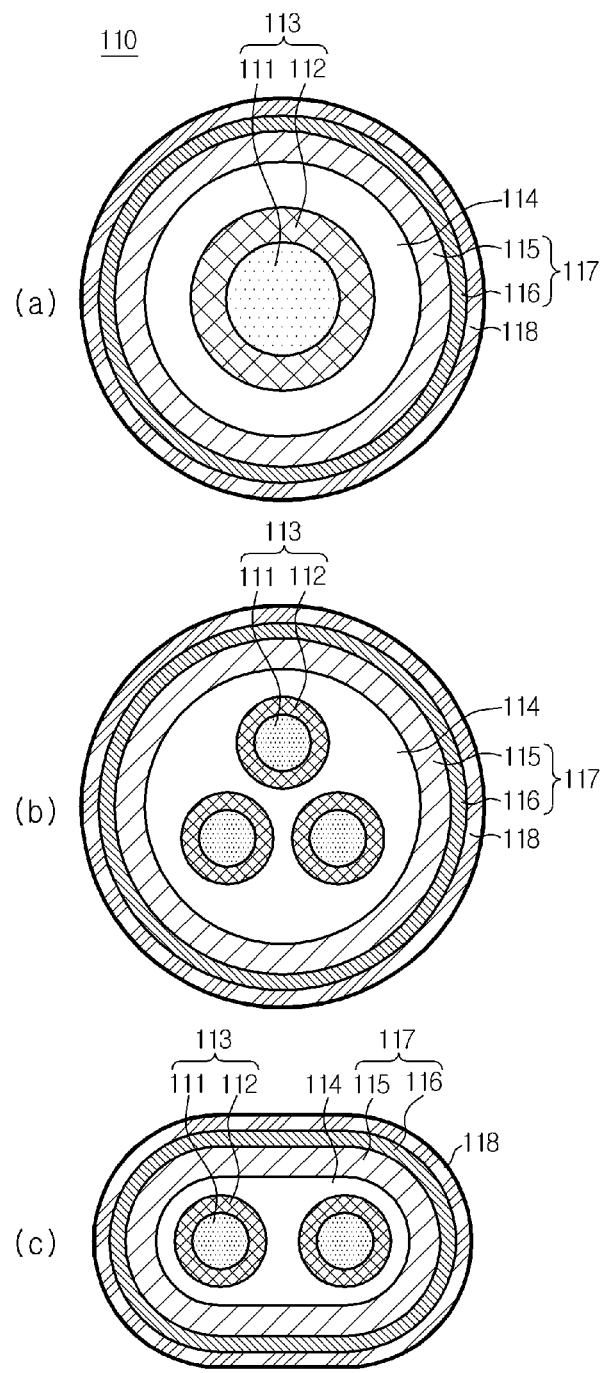
FIG. 2 is a cross-sectional view illustrating a structure of a secondary battery body shown in FIG. 1, taken along the line A-A'.

FIG. 2 is a cross-sectional view illustrating a structure of the secondary battery body 110 shown in FIG. 1, taken along the line A-A'.

Referring to FIG. 2(a), the secondary battery body 110 according to an exemplary embodiment includes an inner current collector 111 having a horizontal cross section of a predetermined shape and extending in a lengthwise direction, and an inner electrode active material 112 formed on a surface of the inner current collector 111. Here, the predetermined shape implies that there is no particular limitation on a shape, and any shape is possible so long as it does not damage the essence of the present disclosure. The horizontal cross section of the inner current collector 111 may be of a circular or polygonal shape, and the circular shape may correspond to a circular structure of geometrically perfect symmetry and an asymmetrical oval structure. The polygonal shape is not particularly limited, and may be, as a non-limiting example, a triangle, a square, a pentagon, or a hexagon. However, in the manufacturing process, a pipe-type current collector, a wound wire-type current collector, a wound sheet-type current collector, or a mesh-type current collector may be used.

Meanwhile, in the specification, a part including the inner current collector 111 and the inner electrode active material 112 will be referred to as an inner electrode layer 113. The secondary battery body 110 may include at least two inner current collectors 111 as shown in FIGS. 2(b) and 2(c). The secondary battery body 110 of FIG. 2(b) has a circular shape of perfect symmetry, and the secondary battery body 110 of FIG. 2(c) has an asymmetrical oval shape, and as illustrated, various shapes are possible. Also, the plurality of inner electrode layers 111 may be not only arranged in parallel but also twisted. The secondary battery body 110 of FIG. 2(b) has three inner electrode layers 111, and the secondary battery body 110 of FIG. 2(c) has two inner electrode layers 111.

In the case where the secondary battery body 110 includes a plurality of inner electrode layers 111, a surface area in contact with an outer electrode layer 117 increases, leading to a high battery rate and excellent battery performance. Also, according to characteristics of an adaptable cable-type secondary battery, a short circuit may occur to an electrode due to repeated use, but in the case where a plurality of electrodes are used, a secondary battery can operate even if a short circuit occurs in any one inner electrode layer 111. Also, in the case where the inner electrode layer 111 having a lower capacity per volume than the outer electrode layer 117 is used, it is easy to adjust capacity balance of the inner electrode layer 111 and the outer electrode layer 117 because a number of the inner electrode layers 111 can be adjusted.

A separation layer 114 is formed on an outer surface of the inner electrode layer 113 to surround the inner electrode layer 113. The separation layer 114 includes an electrolyte that provides a passage of ions. Also, the outer electrode layer 117 is formed on an outer surface of the separation layer 114 to surround the separation layer 114.

In the specification, the outer electrode layer 117 represents a part including an outer current collector 116 corresponding to the inner current collector 111 and an outer electrode active material 115 formed on a surface of the outer current collector 116. The outer current collector 116 may also use a pipe-type current collector, a wound wire-type current collector, a wound sheet-type current collector, or a mesh-type current collector, in the manufacturing process.

The inner current collector 111 and the outer current collector 116 serve to collect electrons produced by electrochemical reactions of the inner electrode active material 112 and the outer electrode active material 115 or to provide electrons required for electrochemical reactions, and generally, use a metal such as copper or aluminum. However, recently, to improve flexibility of the secondary battery body 110 and ensure lightweight of the secondary battery body 110, a conductive polymer such as polypyrrole may be used as a current collector. However, the present disclosure is not limited by the material of the inner current collector 111 and the outer current collector 116.

The inner electrode layer 113 of the present disclosure may be a negative or positive electrode, and the outer electrode layer 117 may be a positive or negative electrode, opposite to the inner electrode layer 113. However, in the specification, for the convenience of description, a description will be provided on condition that the inner electrode layer 113 is set to a negative electrode and the outer electrode layer 117 is set to a positive electrode.

Preferably, the secondary battery body 110 may further include a protection coating 118 surrounding the outer electrode layer 117.

Referring to FIG. 1 again, the first plug 120 is formed at one end of the secondary battery body 110. Also, the second plug 130 is formed at the other end of the secondary battery body 110 where the first plug 120 is absent.

The first plug 120 is electrically connected to the outer current collector 116, and the second plug 130 is electrically connected to the inner current collector 111. Accordingly, in this embodiment, the first plug 120 becomes a positive plug, and the second plug 130 becomes a negative plug. Also, in other embodiments, the first plug 120 may become a negative plug, and the second plug 130 may become a positive plug.

Figure 3:
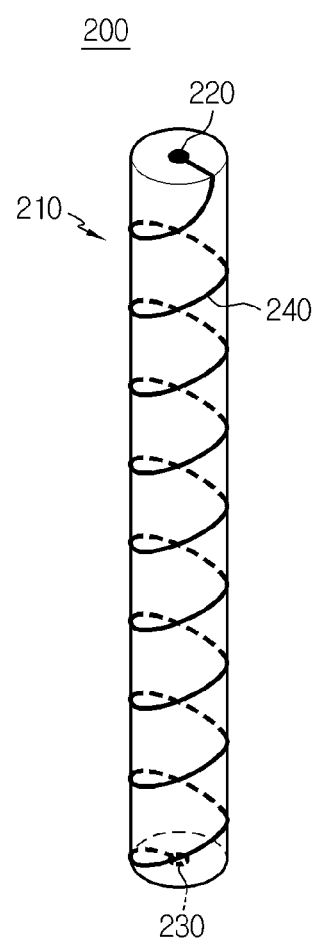
FIG. 3 is a perspective view illustrating a construction of a charging apparatus according to an exemplary embodiment of the present disclosure.

FIG. 3 is a perspective view illustrating a construction of a charging apparatus 200 according to an exemplary embodiment of the present disclosure.

Referring to FIG. 3, the charging apparatus 200 according to an exemplary embodiment of the present disclosure includes a socket 210, a first terminal 220, a second terminal 230, and a secondary coil 240 for wireless charging.

The socket 210 has a space formed inside for mounting a cable-type secondary battery. The socket 210 may have an outer appearance with various shapes including a triangular prism, a square pillar, a pentagonal column, and the like, and for example, the socket 210 may have a cylindrical shape. In the case where the socket 210 is cylindrical, the socket 210 has a cylindrical shape with a hollow inside.

According to an exemplary embodiment of the present disclosure, the cylindrical socket 210 may be open to at least one of a top and a bottom of a cylinder. Through at least one of the open top and the open bottom, a cable-type secondary battery may be mounted in the socket 210.

In the case where a cable-type secondary battery is mounted in the socket 210, the first terminal 220 is electrically connected to an outer current collector of the cable-type secondary battery.

In the case where a cable-type secondary battery is mounted in the socket 210, the second terminal 230 is electrically connected to an inner current collector of the cable-type secondary battery.

Although the embodiment of FIG. 3 shows that the first terminal 220 is disposed at the top of the cylindrical socket 210 and the second terminal 230 is disposed at the bottom of the cylindrical socket 210, an embodiment in which the first terminal 220 and the second terminal 230 of the present disclosure are placed at the contrary locations to this embodiment may be contemplated.

The first terminal 220 may have a shape that the first terminal 220 may be coupled with a first plug electrically connected to an outer current collector of the cable-type secondary battery mounted in the socket 210 and formed at one end of the cable-type secondary battery. Also, the second terminal 230 may have a shape that the second terminal 230 may be coupled with a second plug electrically connected to an inner current collector of the cable-type secondary battery mounted in the socket 210 and formed at the other end of the cable-type secondary battery. For simplified illustration, simple shapes of the first terminal 220 and the second terminal 230 are shown in FIG. 3, but the first terminal 220 and the second terminal 230 may have a plug shape (female terminal) matching the shape (male terminal) of the first plug 120 and the second plug 130 of the cable-type secondary battery 100 presented in FIG. 1 as an example.

One end of the secondary coil 240 for wireless charging is connected to the first terminal 220, and the other end is connected to the second terminal 230. Also, the secondary coil 240 for wireless charging is wound along an outer circumferential surface of the socket 210.

Thus, when the cable-type secondary battery is mounted in the socket 210, the cable-type secondary battery is disposed inside with the secondary coil 240 for wireless charging wound, and the secondary coil 240 for wireless charging is electrically connected between the outer current collector and the inner current collector of the cable-type secondary battery.

The secondary coil 240 for wireless charging represents a wireless power receiver coil among coils for wireless power transmission and reception. The charging apparatus 200 according to the present disclosure corresponds to an apparatus that transfers, to a cable-type secondary battery, a charging power supplied through a method for wireless power transmission and reception. In this instance, a coil installed at the side of a charging power supply apparatus to a cable-type secondary battery is called a primary coil, and a coil installed at the side of a supplied charging power receiver is called a secondary coil. A technology for wireless power transmission and reception that flows an electric current across a primary coil to generate an electromagnetic wave and transmits and receives power wirelessly using an electromotive force generated from a secondary coil in response to the electromagnetic wave being received is widely known to those having ordinary skill in the technical field to which the present disclosure belongs, and a detailed description of the principle of wireless power transmission and reception is omitted herein.

Figure 4:
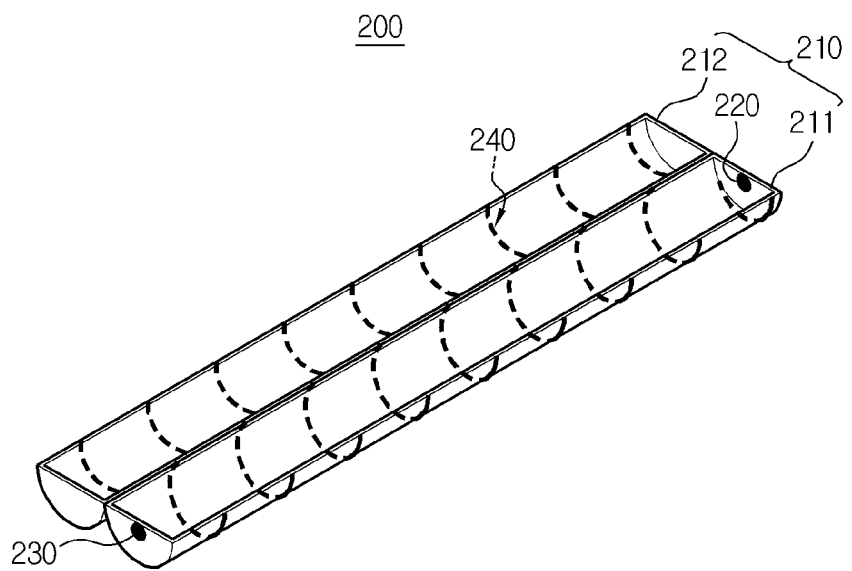
FIG. 4 is a perspective view illustrating a construction of a charging apparatus according to another exemplary embodiment of the present disclosure.

FIG. 4 is a perspective view illustrating a construction of the charging apparatus 200 according to another exemplary embodiment of the present disclosure.

According to another exemplary embodiment of the present disclosure, the socket 210 includes a first cover 211 having a hemispherical cross sectional area and a second cover 212 having a hemispherical cross sectional area. The first cover 211 and the second cover 212 are engaged with each other to form a cylindrical shape. In this instance, when the first cover 211 and the second cover 212 are engaged with each other to form a cylindrical shape, the secondary coil 240 for wireless charging is in a form of surrounding the outer circumferential surface of the socket 210.

Preferably, the first cover 211 and the second cover 212 may be connected such that the first cover 211 and the second cover 212 may come in contact with each other at any one corner to allow opening and closing. In this instance, the first cover 211 and the second cover 212 may be connected through a hinge to allow opening and closing.

That is, after the second cover 212 is open, the cable-type secondary battery is mounted in an inner space of the first cover 211 so that the cable-type secondary battery is electrically connected to the first cover 220 and the second cover 230, and the second cover 212 is closed. Then, the secondary coil 240 for wireless charging formed on the outer circumferential surface of each of the first cover 211 and the second cover 212 is in a form of surrounding the entire socket 210.

Figure 5:
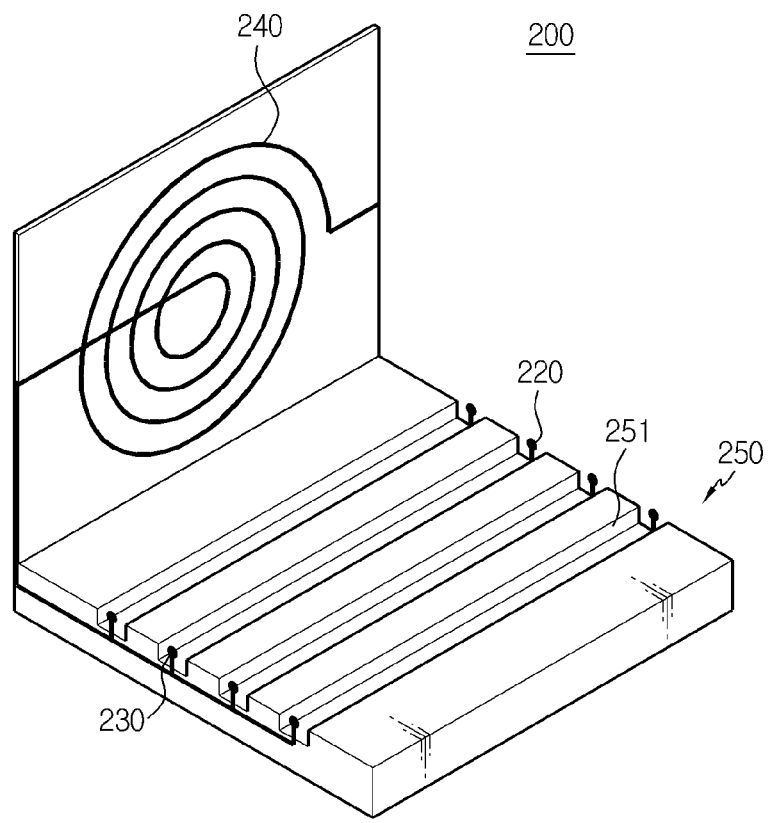
FIG. 5 is a perspective view illustrating a construction of a charging apparatus according to still another exemplary embodiment of the present disclosure.

FIG. 5 is a perspective view illustrating a construction of the charging apparatus 200 according to still another exemplary embodiment of the present disclosure.

Referring to FIG. 5, the charging apparatus 200 according to still another exemplary embodiment of the present disclosure is characterized by including a plate 250 having a slit 251 formed for mounting a cable-type secondary battery.

Dissimilar to the embodiments of FIGS. 3 and 4 described in the foregoing, the charging apparatus 200 of this embodiment includes, as a component, the plate 250 instead of the socket 210, and mounts a cable-type secondary battery in the slit 251 formed on the plate 250 rather than within the socket 210. According to the embodiment of the present disclosure, at least two slits 251 may be formed on the plate 250. Although FIG. 5 shows an embodiment in which four slits 251 are formed, the present disclosure is not limited to the embodiment shown in FIG. 5.

At both ends of the slit 251, a first terminal 220 electrically connected to an outer current collector of the cable-type secondary battery mounted in the slit, and a second terminal 230 electrically connected to an inner current collector of the cable-type secondary battery mounted in the slit may be disposed. For convenience of understanding only, an embodiment corresponding to a case in which the cable-type secondary battery 100 of FIG. 1 previously shown is used is illustrated in FIG. 5, and the locations of the first terminal 220 and the second terminal 230 may vary based on a type of the cable-type secondary battery mounted in the slit 251.

Meanwhile, one end of the secondary coil 240 for wireless charging is connected to the first terminal 220, and the other end is connected to the second terminal 230. In the case where at least two slits are formed on the plate 250, the first terminal 220 and the second terminal 230 electrically connected to cable-type secondary batteries mounted in each of the slits 251 may have an electrically parallel relationship with the secondary coil 240 for wireless charging. In this case, the cable-type secondary batteries mounted in the at least two slits 251 may be simultaneously charged with power generated from the secondary coil 240 for wireless charging.

Meanwhile, the first terminal 220 may have a shape that the first terminal 220 may be coupled with a first plug electrically connected to the outer current collector of the cable-type secondary battery mounted in the slit 251 and formed at one end of the cable-type secondary battery. Also, the second terminal 230 may have a shape that the second terminal 230 may be coupled with a second plug electrically connected to the inner current collector of the cable-type secondary battery mounted in the slit 251 and formed at the other end of the cable-type secondary battery. For simplified illustration, simple shapes of the first terminal 220 and the second terminal 230 are shown in FIG. 3, but the first terminal 220 and the second terminal 230 may have a plug shape (female terminal) matching the shape (male terminal) of the first plug 120 and the second plug 130 of the cable-type secondary battery 100 presented in FIG. 1 as an example.

Figure 6:
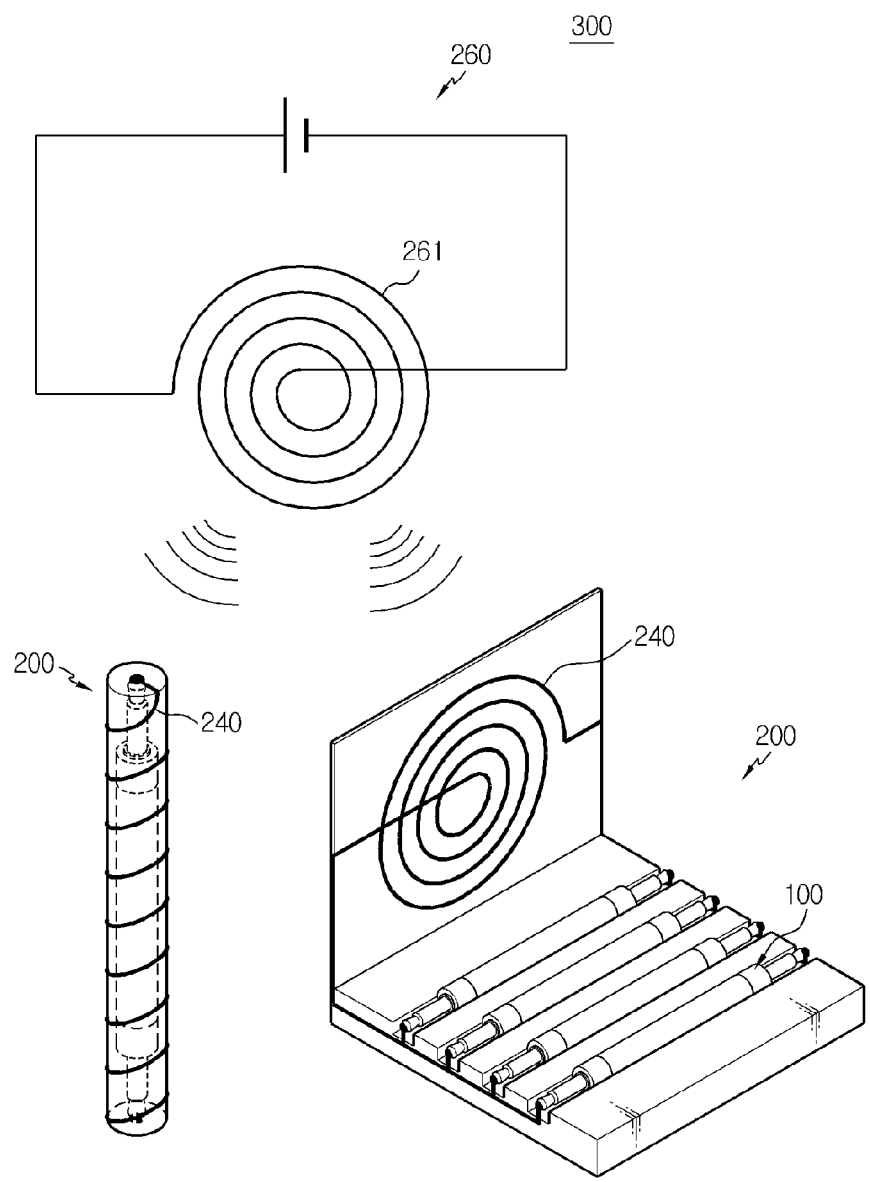
FIG. 6 is a conceptual view illustrating a construction of a wireless charging set for a cable-type secondary battery according to an exemplary embodiment of the present disclosure.

FIG. 6 is a conceptual view illustrating a construction of a wireless charging set 300 for a cable-type secondary battery according to an exemplary embodiment of the present disclosure.

The charging apparatus 200 according to the present disclosure may be a component of the wireless charging set 300 for the cable-type secondary battery including a wireless charging power supply apparatus 260 for a cable-type secondary battery including a primary coil 261 for wireless charging.

According to the present disclosure, even if a secondary coil for wireless power reception is absent from a cable-type secondary battery, charging may be performed by a method for wireless power transmission and reception. Also, power is transferred to a cable-type secondary battery through a secondary coil regardless of a shape of the cable-type secondary battery and a shape of a wireless power transmitter using a primary coil, thereby improving compatibility of a charging apparatus.

While the present disclosure has been described by limited embodiments and drawings, the present disclosure is not limited thereby and various modifications and changes within the spirit of the present disclosure and the appended claims and their equivalents will become apparent to those having ordinary skill in the technical field to which the present disclosure belongs.

What is claimed is:

1. A wireless charging apparatus for cable-type secondary batteries, comprising:
   a plate having a plurality of slits formed for mounting at least two respective ones of the cable-type secondary batteries therein, the slits each having a first end and a second end, and each of the slits having a shape corresponding to a respective one of the cable-type secondary batteries such that each cable-type secondary battery can be received within the respective slit when mounted therein;

a first terminal at a first end of the slits, the first terminal electrically connectable to an outer current collector of a first one of the cable-type secondary batteries when mounted in the first slit of the plate;

a second terminal at a second end of the slits, the second terminal electrically connectable to an inner current collector of the first cable-type secondary battery when mounted in the first slit of the plate; and a secondary coil for wireless charging having one end connected with the first terminal and the other end connected with the second terminal.

2. The wireless charging apparatus for the cable-type secondary batteries according to claim 1, wherein the first terminal and the second terminal electrically connectable to cable-type secondary batteries mounted in the at least two slits have an electrically parallel relationship with the secondary coil for wireless charging.

3. The wireless charging apparatus for the cable-type secondary batteries according to claim 1, wherein the first terminal has a shape such that the first terminal is couplable with a first plug electrically connected to the outer current collector of the first cable-type secondary battery and formed at one end of the first cable-type secondary battery, and the second terminal has a shape such that the second terminal is couplable with a second plug electrically connected to the inner current collector of the first cable-type secondary battery and formed at the other end of the first cable-type secondary battery.

4. A wireless charging set for cable-type secondary batteries, comprising:

a wireless charging apparatus for cable-type secondary batteries as defined in claim 1; and a wireless charging power supply apparatus for cable-type secondary batteries including a primary coil for wireless charging.

* * * * *